US009696140B2

(12) United States Patent
Markendorf

(10) Patent No.: US 9,696,140 B2
(45) Date of Patent: Jul. 4, 2017

(54) LASER TRACKER WITH POSITION-SENSITIVE DETECTORS FOR SEARCHING FOR A TARGET

(71) Applicant: LEICA GEOSYSTEMS AG, Heerbrugg (CH)

(72) Inventor: Albert Markendorf, Walde (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 213 days.

(21) Appl. No.: 14/363,280

(22) PCT Filed: Dec. 6, 2012

(86) PCT No.: PCT/EP2012/074667
§ 371 (c)(1),
(2) Date: Jun. 5, 2014

(87) PCT Pub. No.: WO2013/083707
PCT Pub. Date: Jun. 13, 2013

(65) Prior Publication Data
US 2014/0320643 A1    Oct. 30, 2014

(30) Foreign Application Priority Data
Dec. 6, 2011   (EP) .................................... 11192216

(51) Int. Cl.
*G01B 11/14* (2006.01)
*G01S 17/66* (2006.01)

(52) U.S. Cl.
CPC .............. *G01B 11/14* (2013.01); *G01S 17/66* (2013.01)

(58) Field of Classification Search
None
See application file for complete search history.

(56) References Cited

U.S. PATENT DOCUMENTS 6,504,602 B1   1/2003  Hinderling
7,576,836 B2 * 8/2009  Bridges .................. G01S 5/163
                                               356/3.13
(Continued)

FOREIGN PATENT DOCUMENTS

EP   0 553 266 B1   5/1997
EP   2 071 283 A2   6/2009
(Continued)

OTHER PUBLICATIONS

FARO Technologies, Inc. "FARO Adds Vision to Laser Tracker with New TargetCAM", Press Release dated Nov. 2, 2005.*
(Continued)

*Primary Examiner* — William C Vaughn, Jr.
*Assistant Examiner* — Joseph A Towe
(74) *Attorney, Agent, or Firm* — Maschoff Brennan

(57) ABSTRACT

Some embodiments of the invention relate to a laser tracker for continuously pursuing a reflective target and for determining the position of the target. The method may include a base which defines a vertical axis, a beam guiding unit for emitting a measurement beam, the beam guiding unit being pivotable by motor relative to the base about the vertical axis and an inclination axis, and a measurement axis being defined by an emission direction of the measurement beam. The laser tracker may include a precision distance measurement unit and an angle measurement function. The target search unit may have illumination source for illuminating the target, a first camera with a first position-sensitive detector and at least one part of the illumination beam reflected on the target being determinable as a first target position, and a control and evaluation unit.

24 Claims, 6 Drawing Sheets

(56) References Cited

U.S. PATENT DOCUMENTS

| | | | |
|---|---|---|---|
| 8,031,331 B2 | 10/2011 | Meier et al. | |
| 8,294,769 B2 | 10/2012 | Otani et al. | |
| 8,619,265 B2* | 12/2013 | Steffey | G01B 11/002 356/614 |
| 8,681,317 B2 | 3/2014 | Moser et al. | |
| 2006/0221072 A1 | 10/2006 | Se et al. | |
| 2009/0153667 A1* | 6/2009 | Kumagai | G01S 17/66 348/169 |
| 2010/0128259 A1* | 5/2010 | Bridges | G01B 11/03 356/138 |
| 2011/0181872 A1* | 7/2011 | Dold | G01C 15/002 356/139.04 |
| 2011/0260033 A1* | 10/2011 | Steffensen | G01C 15/002 250/203.1 |
| 2012/0113406 A1 | 5/2012 | Bockem et al. | |

FOREIGN PATENT DOCUMENTS

| | | | |
|---|---|---|---|
| JP | S62-194413 A | 8/1987 | |
| JP | S63-285410 A | 11/1988 | |
| JP | H10-019562 A | 1/1998 | |
| JP | H10-122819 A | 5/1998 | |
| JP | 2001-0117019 A | 4/2001 | |
| JP | 2008-0116384 A | 5/2008 | |
| JP | 2009-014445 A | 1/2009 | |
| JP | EP 2071283 A2 * | 6/2009 | ........... G01C 15/002 |
| JP | 2010-038901 A | 2/2010 | |
| WO | 2007/079600 A1 | 7/2007 | |
| WO | 2010/057169 A2 | 5/2010 | |
| WO | 2010/148525 A1 | 12/2010 | |
| WO | 2010/148526 A1 | 12/2010 | |

OTHER PUBLICATIONS

European Search Report dated Mar. 9, 2012 as received in Application No. EP 11 19 2216.

Badino, H. et al.,"Integrating LIDAR into Stereo for Fast and Improved Disparity Computation", International Conference on 3D Imaging, Modeling, Processing, Visualization and Transmission (3DIMPVT), May 16-19, 2011, pp. 405-412.

Point Gray Research, Versatile Digital Camera, Apr. 20, 2004, 2 pages.

Luhmann, Close Range Photogrammetry, pp. 2-5, Copyright 2006, Whittles Publishing, Scotland, UK.

Sahler, FARO Adds Vision to Laser Tracker with New TargetCAM, pp. 1-2, Nov. 2, 2005, FARO Technologies Inc., Lake Mary, FL.

* cited by examiner

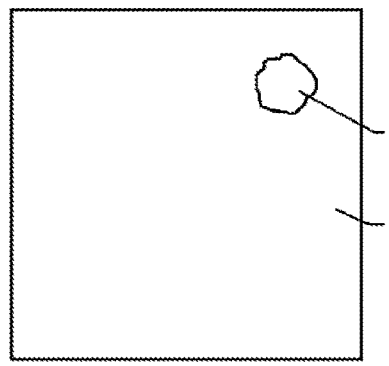
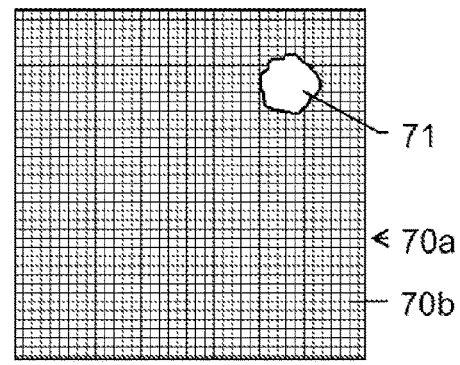
Fig.7a          Fig.7b
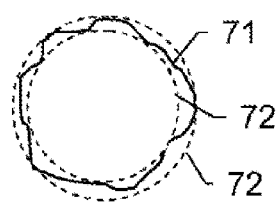
Fig.7c
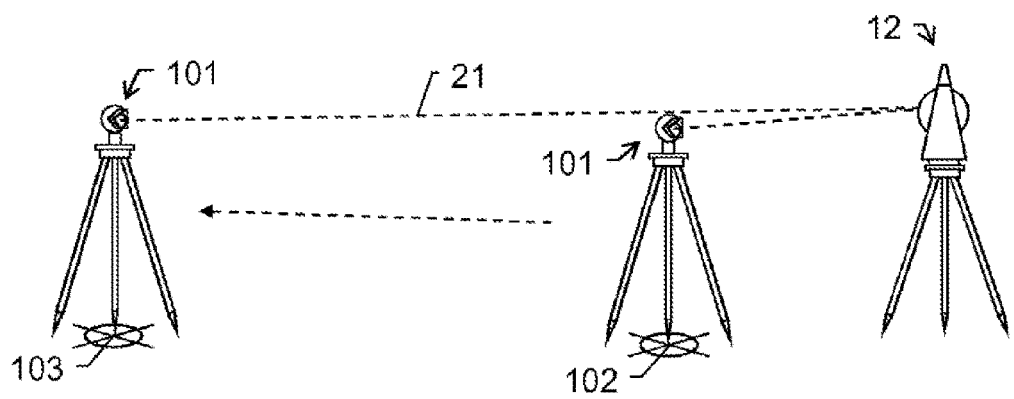
Fig.8

LASER TRACKER WITH POSITION-SENSITIVE DETECTORS FOR SEARCHING FOR A TARGET

FIELD OF THE INVENTION

The invention relates to a coordinate measuring device, in particular a laser tracker, for the progressive tracking of a reflective target and for determining the distance to the target, and a method for finding the target.

BACKGROUND

Measuring devices which are implemented for progressive tracking of a target point and coordinate position determination of this point can be generally summarized, in particular in conjunction with industrial surveying, under the term laser trackers. A target point can be represented in this case by a retroreflective unit (for example, cube prism), which is targeted using an optical measuring beam of the measuring device, in particular a laser beam. The laser beam is reflected in parallel back to the measuring device, wherein the reflected beam is acquired using an acquisition unit of the device. An emitting or receiving direction of the beam is ascertained in this case, for example, by means of sensors for angle measurement, which are associated with a deflection mirror or a targeting unit of the system. In addition, a distance from the measuring device to the target point is ascertained with the acquisition of the beam, for example, by means of runtime or phase difference measurement.

Laser trackers according to the prior art can additionally be embodied having an optical image acquisition unit having a two-dimensional, light-sensitive array, for example, a CCD or CID camera or a camera based on a CMOS array, or having a pixel array sensor and having an image processing unit. The laser tracker and the camera can be installed one on top of another in this case, in particular in such a manner that the positions thereof relative to one another are not variable. For example, the camera is rotatable together with the laser tracker about its substantially vertical axis, but is pivotable up-and-down independently of the laser tracker and is therefore arranged separately from the optic of the laser beam in particular. Furthermore, the camera—for example, as a function of the respective application—can be embodied so it is only pivotable about one axis. In alternative embodiments, the camera can be installed in an integrated construction together with the laser optic in a shared housing.

With the acquisition and analysis of an image—by means of image acquisition unit and image processing unit—of a so-called measuring aid instrument having markings, the relative location of which to one another is known, an orientation in space of an object (for example, a probe) arranged on the measuring aid instrument can be concluded. Together with the determined spatial position of the target point, furthermore the position and orientation of the object in space can be precisely determined absolutely and/or in relation to the laser tracker.

Such measuring aid instruments can be embodied by so-called scanning tools, which are positioned with their contact point on a point of the target object. The scanning tool has markings, for example, light spots, and a reflector, which represents a target point on the scanning tool and can be targeted using the laser beam of the tracker, wherein the positions of the markings and the reflector in relation to the contact point of the scanning tool are precisely known. The measuring aid instrument can also be, in the way known to a person skilled in the art, a handheld scanner, which is equipped for distance measurement, for contactless surface surveying, for example, wherein the direction and position of the scanner measuring beam used for the distance measurement in relation to the light spots and reflectors, which are arranged on the scanner, are precisely known. Such a scanner is described, for example, in EP 0 553 266.

For distance measurement, laser trackers of the prior art have at least one distance meter, wherein it can be implemented as an interferometer, for example. Since such distance measuring units can only measure relative distance changes, in addition to interferometers, so-called absolute distance meters are installed in current laser trackers. For example, such a combination of measuring means for distance determination is known by way of the product AT901 from Leica Geosystems AG. The interferometers used in this context for distance measurement primarily use HeNe gas lasers—as a result of the long coherence length and the measurement range thus made possible—as light sources. The coherence length of the HeNe laser can be several hundred meters in this case, so that the ranges required in industrial metrology can be achieved using relatively simple interferometer constructions. A combination of an absolute distance meter and an interferometer for distance determination using an HeNe laser is known, for example, from WO 2007/079600 A1.

In addition, a divergence of the received measurement beam from a zero position is ascertained on a sensor in modern tracker systems—increasingly as a standard feature. By means of this measurable divergence, a position difference between the center of a retroreflector and the point of incidence of the laser beam on the reflector can be determined and the alignment of the laser beam can be corrected or tracked as a function of this deviation in such a manner that the divergence on the sensor is decreased, in particular is "zero", and therefore the beam is aligned in the direction of the reflector center. By way of the tracking of the laser beam alignment, progressive target tracking of the target point can be performed and the distance and position of the target point can be determined progressively in relation to the measuring device. The tracking can be implemented in this case by means of an alignment change of the deflection mirror, which is movable by a motor and is provided for deflecting the laser beam, and/or by pivoting the targeting unit, which has the beam-guiding laser optic.

The described target tracking must be preceded by coupling of the laser beam to the reflector. For this purpose, in addition an acquisition unit having a position-sensitive sensor and having a comparatively large field of vision can be arranged on the tracker. Moreover, additional illumination means are integrated in devices of this type, using which the target or the reflector is illuminated, in particular using a defined wavelength, which differs from the wavelength of the distance measuring means. In this context, the sensor can be implemented as sensitive to a range around this specific wavelength, for example, to reduce or completely prevent external light influences. By means of the illumination means, the target can be illuminated and an image of the target having illuminated reflector can be acquired using the camera. By way of the imaging of the specific (wavelength-specific) reflection on the sensor, the reflection position in the image can be resolved and therefore an angle in relation to the acquisition direction of the camera and a direction to the target or reflector can be determined. An embodiment of a laser tracker having such a target search unit is known, for example, from WO 2010/148525 A1.

As a function of the direction information which is thus derivable, the alignment of the measuring laser beam can be changed such that a distance between the laser beam and the reflector, to which the laser beam is to be coupled, is reduced. As a result of the offset of the optical sensor axis defined by the sensor and the axis along which the measuring laser beam propagates, the alignment of the beam on the target by means of the sensor-based direction determination to the target and therefore the coupling cannot be performed in a direct step. For a stationary target, multiple iteration steps are required for this purpose, each having a measuring operation (renewed determination of a direction to the target using the sensor) for the approach of the laser beam. Such an approach method therefore has the disadvantage that searching for and targeting the target is a time-consuming operation (since it is iterative) and the searching is not robust and unambiguous, in particular in the event of a relative movement of the target to the sensor. Furthermore, in the event of a movement of the target relative to the laser tracker, an approach of the laser beam to the target can no longer succeed, since a deviation between the target detected by means of the sensor and the laser beam changes progressively in this case. An iterative approach of the beam to the target thus cannot be performed as a result of this sustained deviation change during the movement of the target. Every iteration step having a renewed acquisition of a reflection corresponds in this case to a first such measurement on a (new) target. In general, a large disadvantage of such targeting systems therefore additionally results, that stationary targets can only be targeted using a relatively very large time expenditure and the direct targeting of moving targets is impossible.

SUMMARY

Some embodiments of the present invention may provide an improved laser tracker having a functionality for the precise and more rapid finding and in particular targeting of a target.

The invention relates to a laser tracker for the progressive tracking of a reflective target and for determining the position of the target. The tracker has in this case a base, which defines a standing axis, and a beam guiding unit for emitting measuring radiation and for receiving at least a part of the measuring radiation reflected on the target, wherein the beam guiding unit is pivotable by a motor about the standing axis and an inclination axis in relation to the base and a measuring axis is defined by an emission direction of the measuring radiation. Furthermore, the laser tracker has a fine distance measuring unit for precisely determining the distance to the target by means of the measuring radiation, an angle measuring functionality for determining an alignment of the beam guiding unit in relation to the base, and a target search unit. The target search unit additionally has illumination means for illuminating the target using electromagnetic illumination radiation, a first camera, which defines a first field of vision, having a first position-sensitive detector, and a control and analysis unit configured such that upon execution of a search functionality, finding of the target is performed as a function of a first target position. A first image can be acquired in this case using the first camera, at least a part of the illumination radiation reflected on the target can be determined in the first image as a first target position, and the first camera is arranged having its optical axis offset to the measuring axis.

In addition, the target search unit has a second camera, which defines a second field of vision, having a second position-sensitive detector, wherein a second image can be acquired using the second camera and at least a part of the illumination radiation reflected on the target can be determined in the second image as a second target position, and the second camera is arranged having fixed camera positioning, which is known in relation to the first camera, such that the fields of vision of the first and second cameras at least partially overlap and the second camera is arranged having its optical axis offset to the measuring axis. Furthermore, upon execution of the search functionality, the finding of the target is performed as a function of an integrated consideration of the first and second target positions. The two target positions determined in the two images are used jointly for this purpose for finding the target, i.e., the target is determined from a combination of the image information of the first and second images, wherein the items of information (target positions) of the images are "married" and the target is found on this basis.

In one exemplary embodiment of a laser tracker according to the invention, a target can be acquired by means of the two cameras and the target can be found on the basis of the images generated in this case and the target positions determined in the images. The cameras have, due to the arrangement thereof on the tracker, a shared, overlapping field of vision for acquiring the target in this case. Therefore, the target can be found and localized on the basis of an integrated consideration of the images. The acquisition of the images can be performed progressively—in particular during a pivot movement of the beam guiding unit—wherein an image analysis is performed, for example, by means of image processing, with respect to an evaluation of acquired targets, i.e., whether a reflective target is acquired in the image. If such a target is recognized, the beam guiding unit can thus be aligned such that it can be acquired using both cameras in the overlap region of the two fields of vision of the cameras and can be found in the scope of the target search operation.

In contrast to methods of searching for targets of the prior art, the control and analysis unit can be configured in this case according to the invention such that upon execution of the search functionality, ambiguities, which are present upon a use of only the first target position, which was determined by means of the first camera, for finding the target and by way of a parallax provided by the measuring direction and the optical axes of the first and second cameras, are resolved by a mutual use of both the first and also the second target positions for finding the target.

Upon the use of only one camera to search for the target and an offset of the optical axis of the camera in relation to the measuring axis of the measuring radiation, the target cannot be unambiguously localized by means of the camera, since only one item of direction information is thus derivable from an image, however, a distance to the target and therefore a position of the target cannot be determined. An alignment of the measuring beam on the target is therefore not possible directly, i.e., in one step. One advantage of the use according to the invention of the items of image and target position information of two cameras positioned in a known relationship is that the target can be found directly and no iterative approach to the target must be carried out, but rather the targeting can occur directly.

To find the target, the control and analysis unit can be configured according to the invention such that upon execution of the search functionality, a coarse distance to the target is determined as a function of the first and second target positions.

By way of the known relative positioning of the cameras (known photogrammetric base) and the known offset of the cameras in relation to the measuring axis, a distance to the target, on which the illumination radiation is reflected, can be determined or calculated based on the reflections on the target acquired in the image on the basis of generally known principles of stereo photogrammetry.

In this context, the control and analysis unit can especially be configured according to the invention such that upon execution of the search functionality, respectively a target direction to the target is derived as a function of the first and second target positions, and a coarse position is determined as a function of the target directions, in particular by means of photogrammetry.

If, in addition to a determined distance to the target, an item of direction information to the target is considered, a coarse position of the target can thus be calculated using the acquired images of the cameras. For this purpose, in each case directions can be derived from the target positions acquired in the images and linked to the items of distance information.

According to a further embodiment according to the invention, the first and second cameras are arranged in known positioning and alignment in relation to one another and in relation to the measuring axis, so that a photogrammetric base having known base length is defined by the positions of the first and second cameras.

A further aspect of the invention relates to the positioning of the cameras on the laser tracker. According to the invention, the cameras and the measuring axis can be arranged in relation to one another such that the measuring axis lies at least partially in an overlap region defined by the overlapping fields of vision of the first and second cameras. In this way, an acquisition of the target using the two cameras and guiding of the measuring laser beam onto the target can be implemented. In particular in the case of the targeting of moving targets, such an intersection of the measuring axis with the overlap region in the scope of the targeting process is advantageous.

According to the invention, the first and second cameras can be arranged in this case such that the optical axes thereof are respectively arranged offset in parallel or at a defined angle in relation to the measuring axis.

In special embodiments, an (angled) offset of the optical axes in relation to the measuring axis is therefore implementable in such a manner that the optical axes respectively "glance toward" the measuring axis or "glance away" therefrom, therefore do not extend in parallel to the measuring axis. Such an arrangement can be provided, for example, to generate a relatively large overlap region of the fields of vision or to generate the largest possible overall field of vision.

In general, the cameras mentioned in conjunction with the present invention are implemented having position-sensitive detectors such that the fields of vision thereof in relation to the measuring radiation or the aperture angle of the measuring radiation are large, i.e., the fields of vision are larger than the aperture angle of the beam, to acquire a relatively large region of a measuring environment having potential targets.

In contrast to these cameras, another type of position-sensitive detector (PSD), which is installed in the telescope unit of a laser tracker, for example, and is used for the fine targeting and tracking of a target, has a narrow range of vision. This PSD is arranged such that it can detect the measuring radiation reflected on the target and it makes a divergence of the acquired radiation from a setpoint value able to be ascertained based on this detection (the PSD is thus coupled to the measuring beam path). As a function of this divergence, a deviation of the measuring laser beam from the center of a retroreflector can then be determined and this radiation can be realigned such that the beam is incident centrally on the reflector. Furthermore, such a detector is not suitable for acquiring an image in the meaning of the invention, since solely the retroreflected laser beam is detected and the position thereof is analyzed.

In addition to the parallel offset of the optical axes or a defined angled arrangement (glancing) of the optical axes in relation to the measuring axis, the first and second cameras can be arranged axially-symmetrical in relation to the measuring axis according to the invention. In this context, for example, two cameras can be arranged on a shared side of the laser tracker such that a connection line between the two cameras intersects the measuring axis and the route between the measuring axis and the first camera is substantially identical to the route between the measuring axis and the second camera.

In special embodiments, according to the invention, the laser tracker can have a third or multiple cameras having a third or multiple position-sensitive detectors for acquiring a third or multiple target positions. The third or multiple cameras can be arranged such that a third or multiple optical axes of the third or multiple cameras are arranged offset to the measuring axis. The control and analysis unit can be configured in this case such that upon execution of the search functionality, the searching for the target is performed as a function of the three or more target positions, in particular wherein at least one of the cameras is implemented to acquire electromagnetic radiation in a defined range around an illumination wavelength of the illumination radiation.

Such embodiments can be implemented, for example, with respect to a redundancy of the search functionality, for example, in the event of failure of one or more cameras, or to increase the precision during the target localization.

With respect to the targeting of the target (for example, following the finding of the target) by means of the measuring radiation, the beam guiding unit can be controllable according to the invention by means of the control and targeting unit such that the measuring radiation is aligned as a function of the first and second target positions, in particular automatically, in particular as a function of the coarse position of the target, so that the measuring radiation is incident on the target and the distance to the target can be precisely determined by means of the fine distance measuring unit.

By way of the finding of the target by means of the described search functionality, the measuring radiation can be aligned directly on the target, reflected back thereon, and the distance to the target can be exactly determined. For distance measuring, for this purpose, both an absolute distance measuring unit and an interferometer can be arranged in the tracker, wherein respectively one beam source can be provided for both measuring units and the emitted radiation can propagate along a shared measuring path and finally on a shared measuring axis.

The alignment of the measuring radiation is performed in two axes (standing axis or vertical axis and inclination axis or tilt axis) by means of motors provided on the laser tracker for pivoting the beam guiding unit, in particular servomotors, wherein these can be drivable by means of the control and targeting unit.

A further aspect of the invention relates to the structural design of the laser tracker. According to the invention, the laser tracker can have a support, which is pivotable by a motor about the standing axis in relation to the base and defines the inclination axis or a horizontal or recumbent axis, and a targeting unit, which is implemented as a beam guiding unit and is pivotable by a motor about the inclination axis in relation to the support, having a telescope unit for emitting the measuring radiation and for receiving at least a part of the measuring radiation reflected on the target.

According to a special embodiment of the invention, the illumination means of the laser tracker are implemented such that the electromagnetic illumination radiation can be emitted divergently having a wavelength in the infrared range.

In addition, according to a further embodiment, the first and second cameras are implemented such that essentially only infrared illumination radiation can be acquired, in particular wherein the first and second cameras each have a filter unit for essentially exclusive transmission of the infrared radiation to the respective position-sensitive detector.

Furthermore, the invention relates to a method for searching for a target using a laser tracker, wherein the laser tracker has a base, which defines a standing axis, and a beam guiding unit for emitting measuring radiation and for receiving at least a part of the measuring radiation reflected on the target, wherein the beam guiding unit is pivotable by a motor about the standing axis and an inclination axis in relation to the base and a measuring axis is defined by an emission direction of the measuring radiation. Furthermore, illumination of the target using electromagnetic illumination radiation and position-sensitive acquisition of a first image using a first camera are performed, which camera is arranged on the laser tracker and defines a first field of vision, wherein the first camera is arranged having its optical axis offset to the measuring axis. In addition, a first determination is performed of at least a part of the illumination radiation reflected on the target as a first target position in the first image.

In the scope of the method, in addition a position-sensitive acquisition of a second image is performed using a second camera, which is arranged on the laser tracker and defines a second field of vision, and a second determination is performed of at least a part of the illumination radiation reflected on the target as a second target position in the second image. The second camera is arranged in this case having fixed camera positioning, which is known in relation to the first camera such that the fields of vision of the first and second cameras at least partially overlap and the second camera is arranged having its optical axis offset to the measuring axis. Finding of the target is performed as a function of the first and second target positions.

The method according to the invention can be refined according to the above-described embodiments and refinements of the laser tracker according to the invention, in particular in a similar manner.

In particular, ambiguities, which are present upon a use of only the first target position for finding the target and by way of a parallax provided by the measuring axis and the optical axes of the first and the second cameras, are resolved by a mutual use of both the first and also the second target positions.

Furthermore, a coarse distance to the target can be determined as a function of the first and second target positions. In addition, respectively a target direction to the target can be derived as a function of the first and second target positions, and a coarse position of the target can be determined as a function of the target directions, in particular by means of photogrammetry.

With respect to the alignment of the measuring radiation, the beam guiding unit can be aligned as a function of the first and second target positions, in particular automatically, in particular as a function of the coarse position of the target, so that the measuring radiation is incident on the target and the distance to the target can be precisely determined by means of the fine distance measuring unit.

In particular, at least one position-sensitive acquisition can be performed such that exclusively electromagnetic radiation is acquired in a defined range around an illumination wavelength of the illumination radiation.

According to a specific embodiment according to the invention, known positioning and alignment of the first and second cameras in relation to one another and in relation to the measuring axis are determined, in particular wherein the target is provided in various positions and is targeted and surveyed by means of the measuring radiation, the first and second target positions are determined for each position of the target, and the relative positioning and alignment are derived from the surveying of the target and the target positions determined thereto.

In addition, according to a further embodiment of the invention, the first and the second target positions in particular in the first and second images are determined according to the invention by means of image processing such that a location in the image of an illumination radiation cross-sectional shape acquired in the respective image is represented by the respective target position. In particular, the determination of the first and the second target positions is performed by means of focal point calculation based on the illumination radiation cross-sectional shape acquired in the respective image, in particular by means of brightness and/or contrast analysis, and/or by means of matching, in particular bringing into correspondence, of the illumination radiation cross-sectional shape acquired in the respective image with a stored pattern on the basis of a best fit method—this is performed in particular with subpixel precision, wherein the respective target position of the illumination radiation acquired in the image is determined on the basis of the location of the pattern in the image which is brought into correspondence, in particular with subpixel precision. In particular, an item of information is also stored in this case for the stored pattern, which permits a pattern position, which is defined internally in the pattern and is to be used for the final ascertainment of the target position, within the pattern to be derived, especially wherein the item of information is itself the pattern position defined internally in the pattern or is a defined pattern position determination algorithm such as a pattern focal point determination algorithm.

Furthermore, the invention relates to a computer program product having program code which is stored on a non-transitory computer-readable medium, for controlling or carrying out the method according to the invention.

BRIEF DESCRIPTION OF THE DRAWINGS

The method according to the invention and the device according to the invention will be described in greater detail below solely as examples on the basis of specific exemplary embodiments, which are schematically illustrated in the drawings, wherein further advantages of the invention will also be described. Specifically:

FIGS. 7a-c show an image acquired using a camera of a laser tracker according to the invention having a position-sensitive detector and a method for determining the respective target position; and FIG. 8 shows a method according to the invention for calibrating position and alignment of at least two cameras of a laser tracker according to the invention.

DETAILED DESCRIPTION

Figure 1:
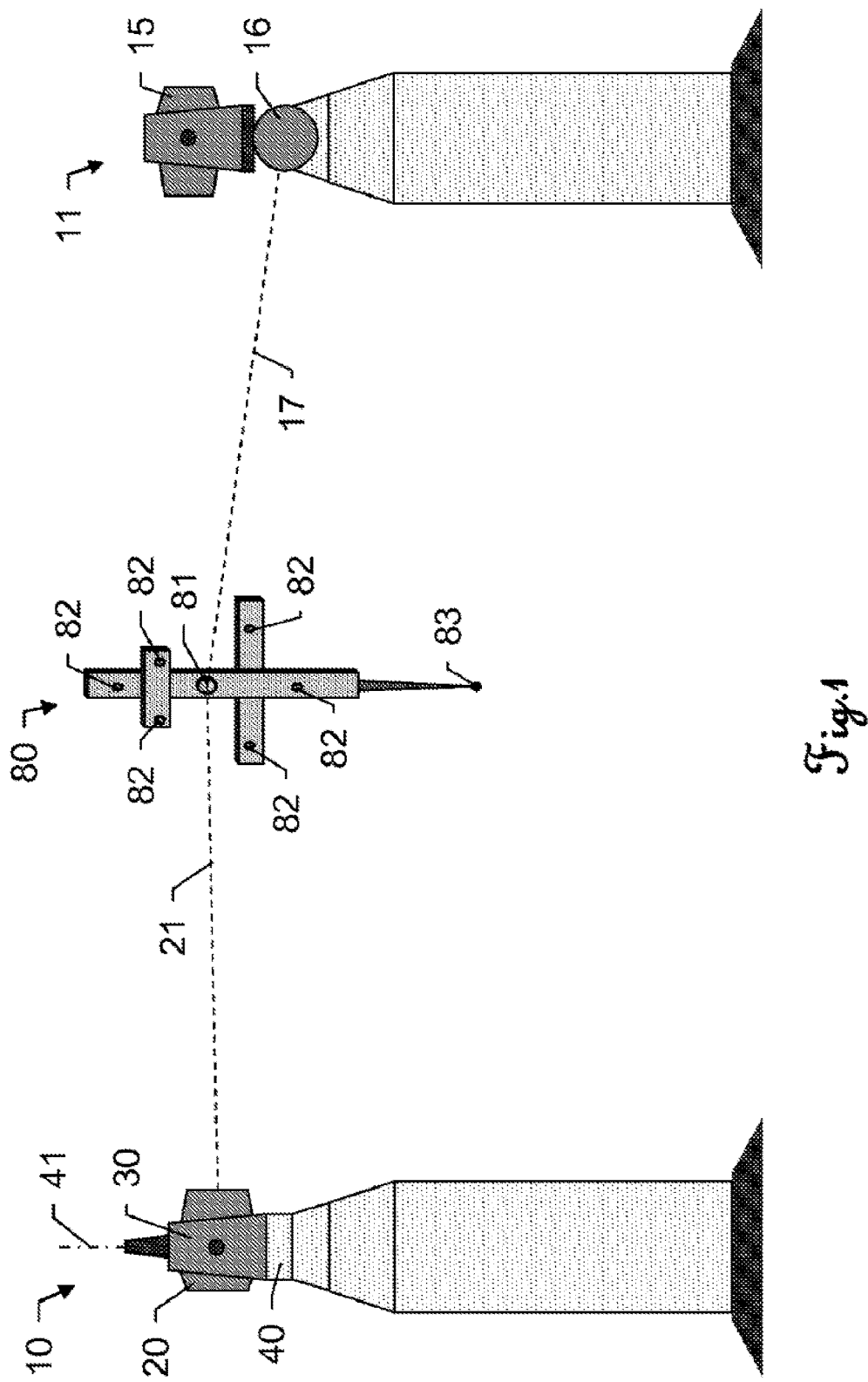
FIG. 1 shows two embodiments of laser trackers according to the invention and a measuring aid instrument.

FIG. 1 shows two embodiments of laser trackers 10, 11 according to the invention and a measuring aid instrument 80, for example, a tactile measuring device. The first laser tracker 10 has a base 40 and a support 30, wherein the support 30 is arranged so it is pivotable or rotatable about a pivot axis 41, which is defined by the base 40, in relation to the base 40. In addition, a targeting unit 20 is arranged on the support 30 such that the targeting unit 20 is pivotable in relation to the support 30 about an inclination axis (transit axis). By way of an alignment capability of the targeting unit 20 thus provided about two axes, a laser beam 21 emitted by this unit 20 can be flexibly aligned and therefore targets can be targeted. The pivot axis 41 and the inclination axis are arranged substantially orthogonally to one another in this case, i.e., slight deviations from exact axis orthogonality can be predetermined and stored in the system, for example, to compensate for measuring errors thus arising.

In the arrangement shown, the laser beam 21 is oriented on a reflector 81 on the measuring aid instrument 80 and is retroreflected thereon back to the laser tracker 10. By means of this measuring laser beam 21, a distance to the reflector 81 can be determined, in particular by means of runtime measurement, by means of the phase measurement principle, or by means of the Fizeau principle. The laser tracker 10 has a fine distance measuring unit for determining this distance between the tracker 10 and the reflector 81 and has angle meters, which permit a position of the targeting unit 20, by means of which the laser beam 21 can be aligned and guided in a defined manner, and therefore a propagation direction of the laser beam 21 to be determined.

In addition, the laser tracker 10, in particular the targeting unit 20, has an image acquisition unit for the purpose of determining a position of a sensor illumination on a sensor or in an acquired image of a CMOS or is implemented in particular as a CCD or pixel sensor array camera. Such sensors permit a position-sensitive detection of acquired illumination on the detector. Furthermore, the measuring aid instrument 80 has a tactile sensor, the contact point 83 of which can be brought into contact with a target object to be surveyed. While this contact exists between the scanning tool 80 and the target object, a position of the contact point 83 in space and therefore the coordinates of a point on the target object can be exactly determined. This determination is performed by means of defined relative positioning of the contact point 83 in relation to the reflector 81 and in relation to markings 82 arranged on the measuring aid instrument 80, which can be implemented as light-emitting diodes, for example. Alternatively, the markings 82 can also be implemented such that they reflect the incident radiation upon illumination, for example, using radiation of a defined wavelength (auxiliary point markings 82 implemented as retroreflectors), in particular display a specific light characteristic, or that they have a defined pattern or color coding. An orientation of the scanning tool 80 can therefore be determined from the location or distribution of the markings 82 in an image acquired using the sensor of the image acquisition unit.

The second laser tracker 11 has a beam guiding unit 16, which is separate from the image acquisition unit 15, for emitting a second laser beam 17, which is also aligned on the reflector 81. Both the laser beam 17 and also the image acquisition unit 15 are respectively pivotable by a motor about two axes and can thus be aligned such that by means of the image acquisition unit 15, the target 81 targeted using the laser beam 17 and the markings 82 of the measuring aid instrument 80 can be acquired. Therefore, a precise distance to the reflector 81 and an orientation of the instrument 80 can also be determined here on the basis of the spatial location of the markings 82.

For the respective alignment of the laser beams 17, 21 on the reflector 81, illumination means for illuminating the reflector 81 using radiation of a specific wavelength, in particular in the infrared wavelength range, are respectively provided on the laser trackers 10, 11, and additionally at least two cameras having position-sensitive detectors are arranged on each tracker 10, 11. The illumination radiation which is reflected on the reflector 81 and radiated back to the laser tracker 10, 11 can be detected by means of the cameras and a position of the reflector 81 on the respective detector can be imaged using each of the position-sensitive detectors. Therefore, both using the first laser tracker 10 and also using the second laser tracker 11, two imaged positions of the reflector can be determined and, as a function of these imaged target positions, the target (reflector 81) can be found—for example, according to generally known principles of photogrammetry—and the targeting unit 20 or the beam guiding unit 16 can be aligned such that the target is targeted using the measuring beam 17, 21.

In addition, on the basis of each two images of a laser tracker 10, 11, a coarse position of the reflector can respectively be determined. This position can be determined according to general geometric or trigonometric principles, for example, according to geometric construction principles of triangles or by means of the law of sines and/or cosines. In addition, generally known methods of photogrammetry (stereo photogrammetry) can be used for the coarse position determination. In addition, the relative positions and in particular alignments of the cameras on the respective tracker 10, 11 in relation to one another are known for this purpose.

The illumination means and the cameras can be arranged in this context, for example, on the image acquisition unit 15, the beam guiding unit 16, the targeting unit 20, the support 30, or the base 40 in respective defined positions.

By means of the knowledge of the positioning of the cameras in relation to an emission direction of the respective laser beam 17, 21, the laser beam 17, 21 can be aligned on the ascertained coarse position of the reflector 81 and coupled thereon (lock-on). Thus, in spite of a structurally related offset of the laser emission direction to the acquisition directions of the cameras, rapid alignment of the respective beam 17, 21 can be performed and a parallax provided by the optical axes of the cameras and the laser beam 17, 21 can be resolved. The laser beam 17, 21 can especially be aligned on the target 81 directly, i.e. without an iterative intermediate step.

In particular—alternatively or additionally to the determination of the coarse position of the reflector—a coarse distance to the reflector 81 can be determined from the target positions, which are acquired on the detectors (on a laser tracker 10, 11) and imaged. This determination can also be performed by means of generally valid geometric principles, for example, by means of the altitude theorem for triangles and/or by means of the law of sines and/or cosines.

In addition, an alignment according to the invention of the laser beam 17, 21 can also be applied in laser trackers without image acquisition unit 15 for orientation determination (six-degrees-of-freedom camera) of a measuring aid instrument 80 (3-D laser tracker).

Figure 2:
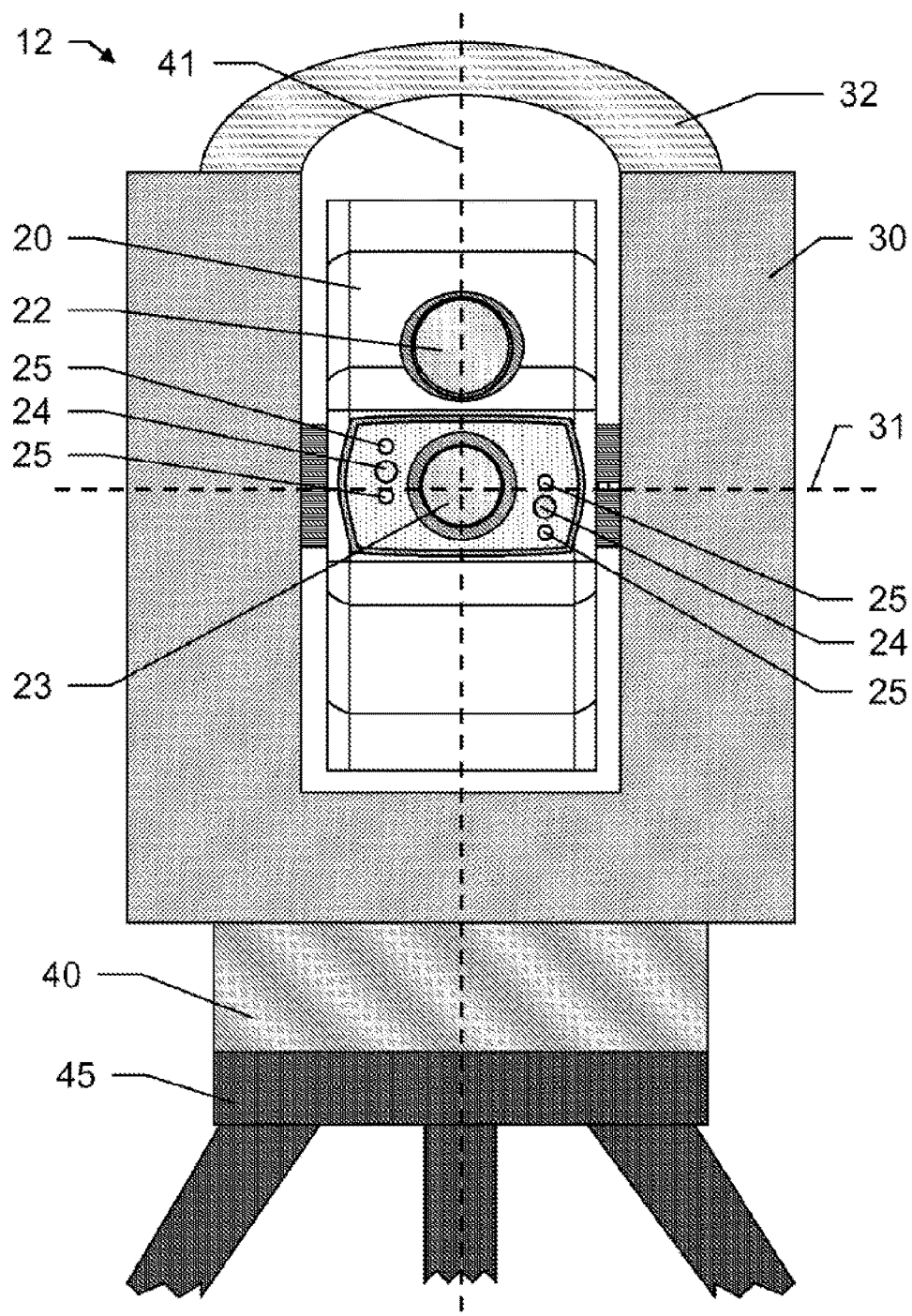
FIG. 2 shows a further embodiment of a laser tracker according to the invention.

FIG. 2 shows a further embodiment of a laser tracker 12 according to the invention having a base 40, which is arranged on a tripod 45 and defines a pivot axis 41. In addition, a support 30, which defines an inclination axis 31 and is pivotable about the pivot axis 41 in relation to the base 40, and has a handle 32, is arranged on the base. Furthermore, a targeting unit 20 is provided, wherein this targeting unit 20 is installed so it is pivotable about the inclination axis 31 in relation to the support 30.

The targeting unit 20 furthermore has a vario-camera having a vario-camera objective 22 and an optic 23, which is assigned to a distance measuring and tracking unit arranged in the targeting unit 20, wherein by means of the optic 23, a measuring laser beam is emitted from the distance measuring and tracking unit for precise determination of a distance to a target and for tracking the target. In addition, two cameras 24 each having a camera optic and each having a position-sensitive detector and additionally illumination means 25, which are implemented as LEDs, for example, and emit light in the infrared range in operation in particular, are provided on the targeting unit 20. Using these illumination means 25, a target, for example, a reflector, can therefore be illuminated or irradiated and at least a part of the radiation is reflected back by the reflector in the direction of the laser tracker 12 or in the direction of the cameras 24. The reflected light is then acquired using the cameras 24 and imaged by means of the camera optics on the respective position-sensitive detector as the respective first and second target positions. Respectively a direction to the target position and therefore an offset in relation to a zero position on the respective detector and/or a direction angle, in particular two direction angles for two detector axes, for example, for an X axis and Y axis predefined by the dimensioning of the detector, can now be determined therefrom for each of these target positions in consideration of the alignment of the detectors. By means of these positions of the target thus acquired, automated finding of the target can be performed. The finding of the target can be performed in particular by means of stereo photogrammetry.

As a function of the direction angles determined by means of the two detectors, a coarse position of the target and/or a coarse distance to the target can then be coarsely determined on the basis of the known relative positioning of the cameras 24, for example, by means of a mathematically geometrical triangle construction.

Using the known alignments of the cameras 24 relative to the measuring direction of the measuring laser beam, which can be determined by means of angle meters arranged on the beam guiding unit 16 or by means of angle meters arranged on the base 40, the support 30, and/or targeting unit 20, the determined coarse position or coarse distance can be processed in the laser tracker 12, in particular by means of the control and analysis unit, such that the measuring laser beam can be aligned on the determined coarse position and therefore on the target.

After the laser beam has been aligned on the reflector and reflected back thereby, a precise distance to the reflector 81 can be determined by means of a fine distance measuring unit in the laser tracker 12 or in the targeting unit 20. Furthermore, the laser beam can then be coupled on the reflector 81 (retroreflector) and the reflector 81 can be tracked using the beam. For this purpose, on a further position sensor assigned to the beam path of the measuring radiation, a position of the reflected measuring beam on the sensor and a divergence of the incident radiation with respect to a zero point position are determined. By means of this divergence, which can be determined on the sensor in two directions, a position change of the reflector 81 can be detected and the laser beam can be tracked in accordance with this change and therefore the reflector 81 can be progressively targeted.

The cameras 24 (having camera optics and detectors) are arranged such that the fields of vision of the cameras at least partially overlap (intersect) and the target can therefore be acquired in the fields of vision of both cameras 24, in particular can be acquired simultaneously using both cameras 24. The first camera can have a large field of vision in this case, wherein the second camera can have a field of vision which is comparatively smaller. Therefore, on the one hand, a large region can be acquired (by means of the first camera) and simultaneously a high precision in the target position determination can be implemented (by means of the second camera). Alternatively, both cameras 24 can have a large field of vision, so that the largest possible overlap region can be generated (with lower measurement precision), or both cameras 24 can be embodied having a narrow field of vision, so that an increased precision is achieved in the coarse position determination (with smaller overlap region and therefore smaller measurement region).

In the embodiment shown, the cameras 24 are arranged on the targeting unit 20 such that their acquisition directions do not lie in a plane which is defined by the pivot axis 41 and the center point of the optic 23, or in a plane which is defined by the inclination axis 31 and the center point of the optic 23, but at least one of the cameras can be arranged in one of the corresponding planes in an alternative embodiment.

In a special embodiment of a laser tracker according to the invention, the reflected illumination light can be detected using at least three cameras and therefore three target positions on three position-sensitive detectors and corresponding direction angles can be determined. A determination of the coarse position then results as a function of the imaged three target positions on the detectors.

In a special embodiment of the laser tracker 12, a coarse distance to the target can be derived as a function of the target positions, which are imaged by the reflected illumination radiation, on the detectors by means of mathematically geometric calculation methods.

Figure 3A:
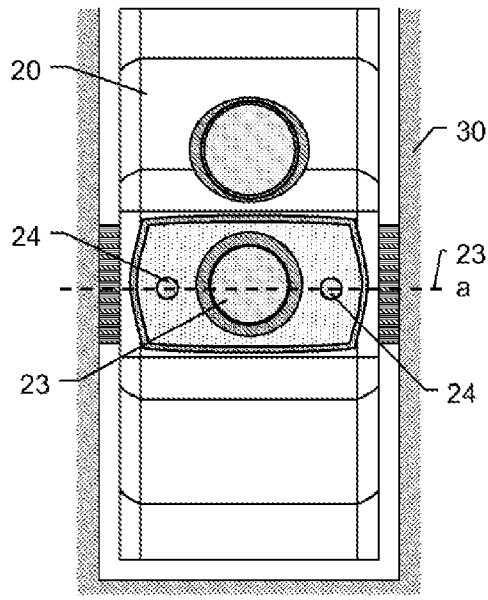
FIGS. 3a-d show four further embodiments according to the invention of a targeting unit of a laser tracker according to the invention.
Figure 3B:
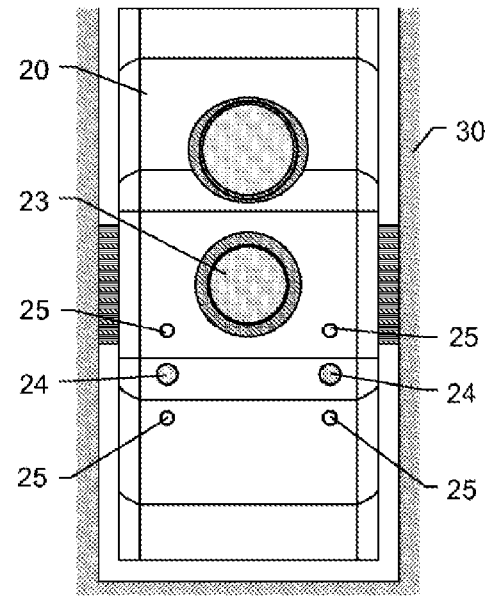
Figure 3C:
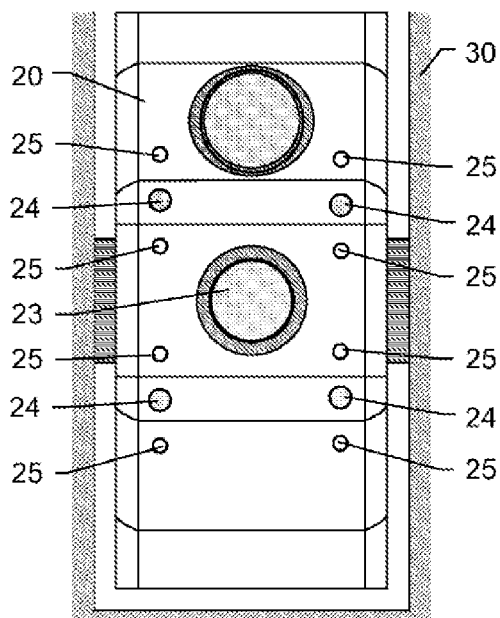

FIGS. 3a, 3b, and 3c each show a further embodiment of a targeting unit 20 according to the invention of a laser tracker. The targeting units 20 are again arranged so they are pivotable about an inclination axis in relation to a support 30 and have an optic 23 of a telescope unit for emitting measuring radiation and for precisely determining a distance to a target by means of the measuring radiation. The embodiments differ by way of the respective arrangement and/or number of the cameras 24 and illumination means 25 provided, which are implemented as LEDs, for example.

In FIG. 3a, two cameras 24 are arranged on a shared axis 23a through the center point of the telescope optic 23. Using the cameras 24, according to the above-described procedure, a target can be acquired on a respective detector, found by means of further processing steps, and targeted using the measuring beam by an alignment of the targeting unit 20. The direction in which each of the cameras 24 sees a reflector deviates from the direction which must be set for the measuring beam to be incident on the reflector. To ascertain this deviation, a coarse distance can be determined with the aid of the parallax angle, which can be derived from the viewing directions of the cameras 24 to the reflector.

FIG. 3b also shows two cameras 24, which are arranged offset below the optic 23, and four illumination means 25, which are used to illuminate the target. The illumination means 25 are respectively arranged symmetrically about the respective camera 24 here. Finding of a reflecting target may also be carried out using this embodiment according to the invention on the basis of two images acquired using the cameras 24. By way of the offset of the optical axes of the cameras 24 in relation to the center point of the telescope optic 23, through which the measuring beam of the targeting unit 20 is essentially emitted, the finding can be implemented here especially by the determination of a coarse distance to the target from the two acquired images (photogrammetry). For this purpose, for example, by means of geometrical calculation principles, a height of a triangle defined by the camera positions and the target can be determined. In addition, a coarse position of the target can be determined using an additional consideration of the directions to the target. The directions to the target can be derived in this case from the acquired images.

FIG. 3c shows a further embodiment according to the invention of the targeting unit 20 having four cameras 24, to which two illumination means 25 for illuminating a target are respectively assigned. The cameras 24 are arranged in this case in a defined position relationship in relation to a measuring axis, the location of which is defined by the optic 23. Due to the larger number of cameras 24 and the images which can thus be acquired of a shared reflective target, finding the target by means of these images can be performed more precisely and therefore more rapid targeting of the target using the measuring radiation can be achieved. In addition, this embodiment offers the advantage of redundancy, i.e., if one (or two) of the cameras 24 fail, the target can thus still be found by means of the remaining functioning cameras 24. A further advantage by way of such an arrangement of the cameras 24 is an enlarged overall field of vision thus resulting, which results from the partial intersection of the respective camera fields of vision. In particular, an increased precision with respect to the target finding or target position determination can therefore be achieved, especially in a region about the measuring axis. For this purpose, the four camera fields of vision can jointly overlap in this region. Due to the larger number of cameras 24 and the images of a shared reflective target which can thus be acquired, in addition to the more precise finding of the target by means of these images, more rapid targeting of the target using the measuring radiation can be achieved.

Figure 3D:
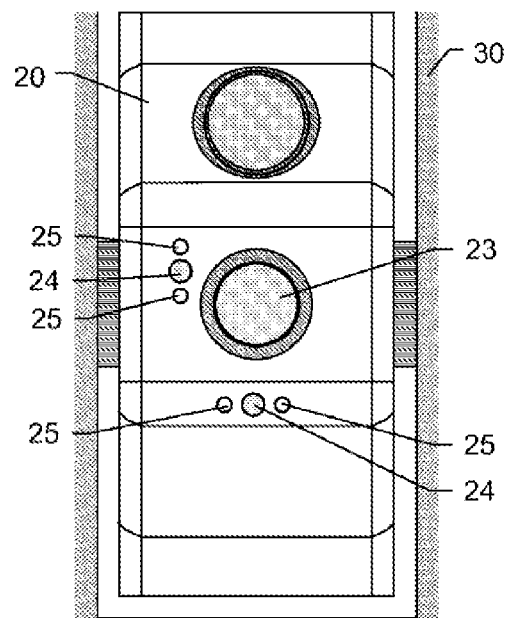

FIG. 3d shows a further embodiment according to the invention of the targeting unit 20 having two cameras 24, to which two illumination means 25 for illuminating a target are respectively assigned. The camera-illumination means combinations are arranged asymmetrically about the telescope optic 23 in this case. A first of these combinations is arranged laterally to and the second is arranged below the telescope optic 23.

The cameras 24 are again arranged substantially axially-symmetrically in each case in pairs to the measuring direction in this case, the location of which is defined by the center point of the optic 23. Due to the larger number of cameras 24 and the images of a shared reflective target which can thus be acquired, the finding of the target by means of these images can be performed more precisely and therefore more rapid targeting of the target using the measuring radiation can be achieved. By means of the specific arrangement of the illumination means 25 on the targeting unit 20, finding of the target according to the invention can also be performed using this embodiment.

Figure 4:
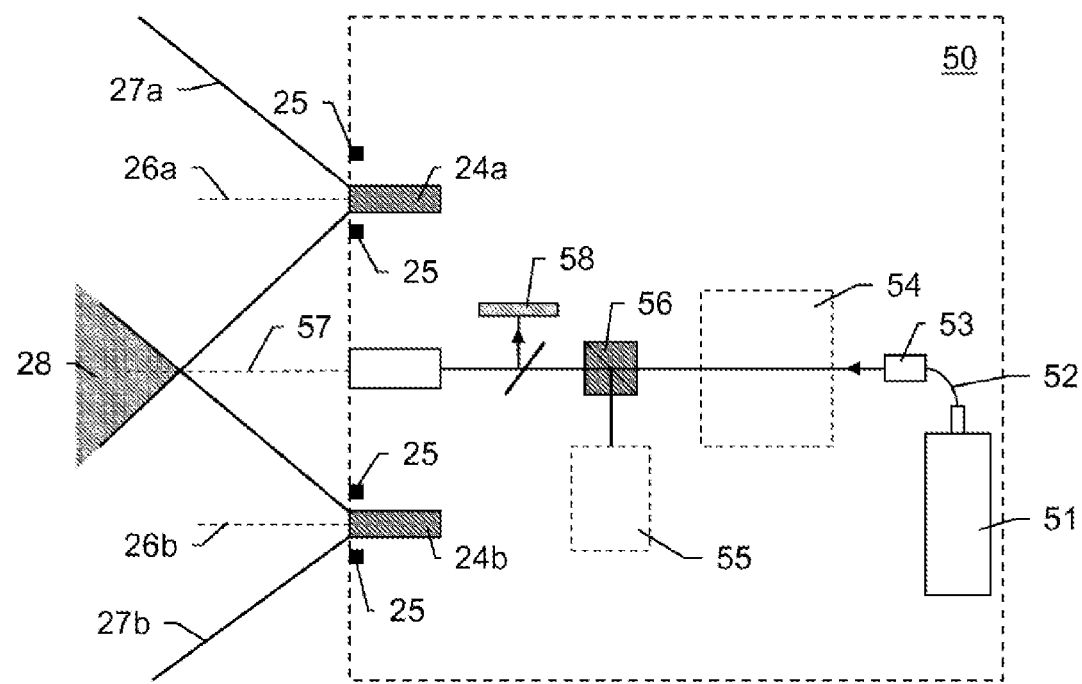
FIG. 4 shows a first embodiment of an optical structure of a laser tracker according to the invention.

FIG. 4 shows an embodiment of an optical structure of a laser tracker according to the invention. An optical unit 50 of the laser tracker has in this case a laser beam source 51—for example, an HeNe laser source or a laser diode—and a collimator 53 for coupling the laser radiation generated using the beam source 51 into the measuring beam path. The radiation is guided in the structure shown by means of an optical fiber 52 from the laser beam source 51 to the collimator 53, but can alternatively also be coupled directly or by optical deflection means into the measuring beam path. The optical unit 50 additionally has an interferometer unit 54, by means of which distance changes to the target can be detected and measured. The radiation generated using the beam source 51 is used as measuring radiation for the interferometer 54, split in the interferometer into a reference path and a measuring path, and detected, after reflection of the measuring beam on the target, together with the reference beam on a detector. In addition, an absolute distance measuring unit 55 having a further beam source and a further detector is provided. This unit 55 is used for determining the distance to the target, wherein the radiation generated thereby is guided by means of a beam splitter 56 together with the interferometer radiation onto a shared measuring beam path. The arrangement of the optical components and the guiding of the measuring radiation in the optical unit 50 define a measuring direction or an optical measuring axis 57. For a precise determination of a distance to the target, measured values of both absolute distance meter 55 and interferometer 54 can be taken into consideration and in particular linked. In a special embodiment of a laser tracker, absolute distance meter 55 and interferometer 54 can define different measuring beam paths and/or can be arranged structurally separated, in particular in different measuring groups.

The optical unit 50 furthermore has two cameras 24a, 25a having a respective optical axis or acquisition direction 26a, 26b and illumination means 25. Furthermore, each of the cameras 24a, 24b defines a field of vision 27a, 27b, wherein the cameras 24a, 25a are arranged such that the fields of vision 27a, 27b overlap and therefore an overlap region 28 is established.

By means of the illumination means 25, electromagnetic radiation can be emitted to illuminate the target. If this radiation is reflected on the target and at least partially reflected in the direction of the two cameras 24a, 24b, the reflected illumination radiation can be acquired using both cameras 24a, 24b in one image in each case as a target position. Through the arrangement of the cameras 24a, 24b such that an overlapping region of vision 28 is provided, the target can be acquired in this region 28 using both cameras 24a, 24b. An exemplary embodiment of target acquisition and finding of the target by means of acquired images is shown in FIGS. 5a and 5b.

In addition, a position-sensitive detector 58 (PSD) is arranged in the optical unit 50 such that measuring laser radiation reflected on the target can be detected thereon. By means of this PSD 58, a divergence of the acquired beam from a detector zero point can be determined and tracking of the laser beam on the target can be performed on the basis of the divergence. For this purpose and to achieve a high precision, the field of vision of this PSD 58 is selected to be as small as possible, i.e., corresponding to the beam diameter of the measuring laser beam. An acquisition using the PSD 58 is performed coaxially to the measuring axis 57, so that the acquisition direction of the PSD 58 corresponds to the measuring direction. The application of the PSD-based tracking and the fine targeting can first be performed after the measuring laser has been aligned on the retro-reflecting target on the basis of the image acquisition of the two cameras 24a, 24b and a photogrammetric analysis of the images.

Figure 5A:
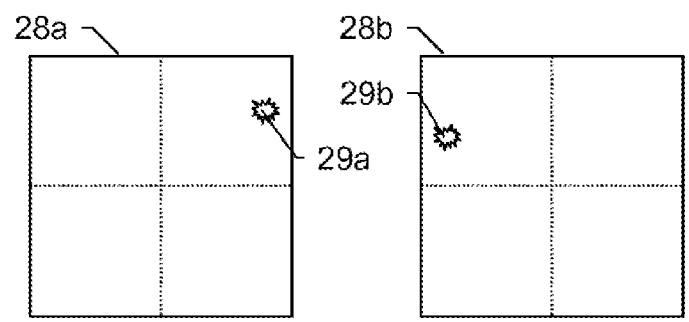
FIGS. 5a-b show two position-sensitive detectors having acquired target positions and finding of the target according to the invention.

FIG. 5a shows two position-sensitive detectors 28a, 28b, wherein one target position 29a, 29b is imaged on each detector. The target positions 29a, 29b can be acquired by a reflection of illumination radiation on the target using the detectors 28a, 28b of two cameras. In this case, two images can be generated, which each show one target position 29a, 29b and therefore specify a relative direction of each detector 28a, 28b in relation to the target or indicate a deviation of the target positions 29a, 29b from a detector zero point.

Figure 5B:
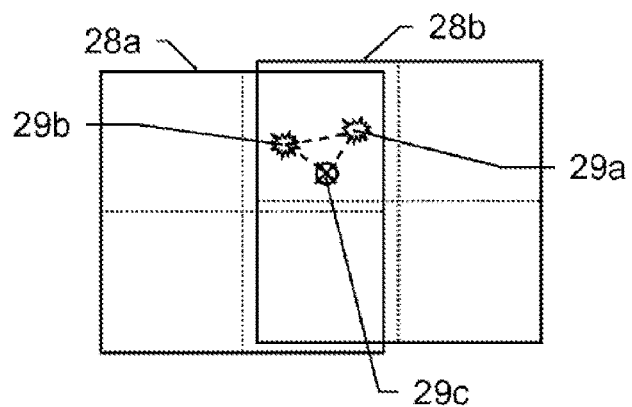

FIG. 5b shows a superposition of the images generated using the detectors 28a, 28b with the target positions 29a, 29b. The acquired target positions 29a, 29b are transferred in this case into a shared coordinate system which is referenced in relation to the measuring unit of the laser tracker. The finding of the target 29c can now be performed by means of a (coordinate) analysis of the first target position 29a and the second target position 29b, wherein, for example, a connection route between the positions 29a, 29b can be constructed and a target coordinate can be determined therefrom. Such a determination can be performed in particular in the case of an axially-symmetrical distribution of the detectors 28a, 28b about a telescope optic or about the measuring axis. Using the known and fixed relative positioning of the cameras or detectors 28a, 28b to one another, as a result, a coarse distance to the target and/or a coarse position of the target can be calculated.

On the basis of this target localization and using known positioning of the cameras to the measuring unit (interferometer and absolute distance meter) or the emission direction thereof, furthermore the measuring laser beam of the laser tracker can be aligned on the position of the target and a precise distance to the target can be determined.

With the aid of such target finding, the targeting of the target 29c can be performed more efficiently, rapidly, and directly, wherein an iterative approach according to methods of the prior art requires multiple steps and is therefore more time-consuming and imprecise.

Figure 6:
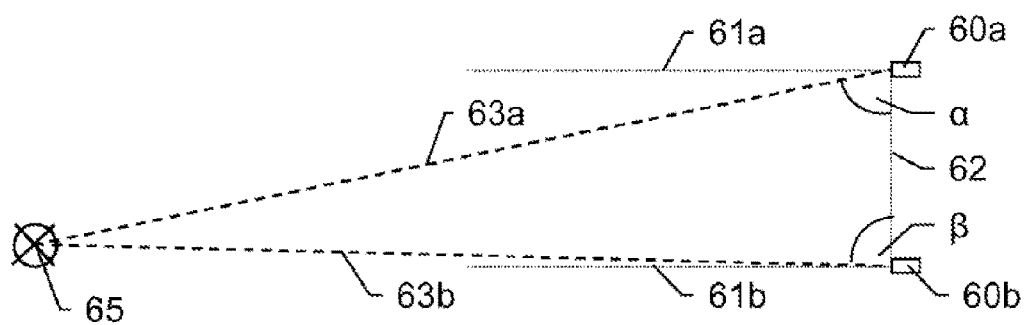
FIG. 6 shows a geometrical approach for a method for finding the target.

The determination of the coarse distance or the coarse position can especially be performed by means of the use of geometrical computing principles. This is illustrated as an example in FIG. 6. Two cameras 60a, 60b respectively acquire the target 65 here and are positioned in relation to one another such that a connection route 62 between the cameras 60a, 60b, in particular with respect to the length thereof, and the respective acquisition directions 61a, 61b of the cameras 60a, 60b are known (photogrammetric base). From the images acquired using the cameras 60a, 60b, a direction 63a, 63b to the target can respectively be determined and therefore an angle α between the direction 63a and the connection route 62 and an angle β between the direction 63b and the connection route 62 can be derived.

On the basis of these determined specifications, for example, by using the "altitude theorem for triangles" ($h_a = c * \sin \beta$), the "total of angles in the triangle" ($\alpha + \beta + \gamma = 180°$), and the "law of sines" ($a/\sin \alpha = c/\sin \gamma$), a distance from the connection route 62 to the target 65 can be calculated.

FIG. 7a shows an image 70, which is acquired using a camera of a laser tracker according to the invention having a position-sensitive detector, having illumination radiation acquired in the image, which was reflected from an illuminated target. According to the shape of the radiation cross section of the illumination radiation, an illumination radiation cross-sectional shape 71 is acquired in the image 70. FIG. 7b shows in this context the location of the incident illumination radiation on the position-sensitive detector 70a of the camera. The radiation 71 incident on the detector 70a extends over a number of individual sensor pixels 70b, wherein the shape of the radiation can be determined as a function of the size and number of sensor pixels 70b.

To determine the location of the illumination radiation cross-sectional shape 71 on the sensor 70a or in the image 70, an analysis can be executed based on image processing such that a target point is thereby determined, which represents the location of the illumination radiation in the image. The control and analysis unit of the laser tracker has for this purpose, according to the invention, a target position determination functionality, upon the execution of which the first (and the second) target position in the first (and second) image 70 are determined by means of image processing such that by way of the respective target position, a location in the image 70 of the illumination radiation cross-sectional shape 71 acquired in the respective image 70 is represented. This can be performed in particular by means of focal point calculation based on the illumination radiation cross-sectional shape 71 acquired in the respective image 70, in particular by means of brightness and/or contrast analysis.

Alternatively or additionally, the determination of the location—as shown in FIG. 7c—can be performed by means of matching, in particular bringing into correspondence, of the illumination radiation cross-sectional shape 71 acquired in the respective image with a stored pattern 72 (here: circular shape) on the basis of a best fit method, in particular with subpixel precision, wherein the respective target position of the illumination radiation 71 acquired in the image is determined on the basis of the location of the pattern in the image which is brought into correspondence, in particular with subpixel precision.

In particular, an item of information can also be stored in this case for the stored pattern, which permits a pattern position, which is defined internally in the pattern and is to be used for the final ascertainment of the target position, within the pattern to be derived, especially wherein the item of information is itself the pattern position defined internally in the pattern or is a defined pattern position determination algorithm such as a pattern focal point determination algorithm.

If the pattern 72 is thus adapted to the shape of the acquired illumination radiation, thus, on the basis of the already stored pattern properties, a specific point—in the circular shape shown here, the circle center point, for example—can be derived as the target position to be determined in the image 70 or on the sensor 70a. The pattern 72 can also be defined in this case, for example, as an ellipse or polygon.

FIG. 8 shows a method according to the invention for calibrating position and alignment of at least two cameras 24 of a laser tracker 12 according to the invention, in particular according to an embodiment according to one of FIGS. 1-4.

The two cameras 24 each have a camera optic and each have a position-sensitive detector and additionally illumination means 25, which are implemented as LEDs, for example, and in operation in particular emit light in the infrared range. Using these illumination means 25, a target 101, for example, a reflector can therefore be illuminated or irradiated and at least a part of the radiation can be reflected back by the reflector in the direction of the laser tracker 12 or in the direction of the cameras 24. The reflected light is then acquired using the cameras 24 and imaged by means of the camera optics on the respective position-sensitive detector as the respective first and second pixel or target position.

A direction to the target position and therefore an offset in relation to a zero position on the respective detector and/or a direction angle can respectively be determined therefrom—after completed calibration of the system 12—for each of these target positions in consideration of the alignment of the detectors. By means of these positions of the target thus acquired, automated finding of the target 101 can be performed.

For the calibration, the target 101 is measured in a first position 102 by means of the measuring radiation 21 and in addition the respective target positions of the reflected illumination radiation are determined on the position-sensitive detectors of the cameras 24. Subsequently, the target 101 is offset into the position 103 and the measuring operation is repeated. Alternatively, a second target can also be used in the position 103. The calibration of the system 12 can be performed from the measurement data thus acquired such that the relative positioning of the cameras to one another and to the measuring axis can be derived. The targeting direction for the measuring radiation is respectively known in this case and the target positions can respectively be assigned to this direction. An orientation of the respective camera can then be concluded from these relationships.

In other words, the laser tracker 12 has a calibration function, upon the execution of which the known positioning and alignment of the first and second cameras in relation to one another and in relation to the measuring axis are determined. In this context, in particular the target 101 is provided in various positions 102, 103 and targeted and surveyed by means of the measuring radiation 21, for each position 102, 103 of the target 101, the first and second target positions are determined and the relative positioning and alignment of the camera are derived from the surveying of the target 101 and the target positions determined thereto in the image.

It is obvious that these illustrated figures only schematically illustrate possible exemplary embodiments. The various approaches can also be combined according to the invention with one another and with photogrammetric methods for determining distances and/or positions and with measuring devices of this type, in particular laser trackers, of the prior art.

What is claimed is:

1. A laser tracker for progressive tracking of a reflective target and for determining a position of the target having:
   a base which defines a standing axis,
   a beam guiding unit for emitting measuring radiation and for receiving at least a part of the measuring radiation reflected on the target, wherein
   the beam guiding unit is pivotable by a motor about the standing axis and an inclination axis in relation to the base and
   a measuring axis is defined by an emission direction of the measuring radiation
   a fine distance meter for precisely determining the distance to the target using the measuring radiation,
   an angle sensor for determining an alignment of the beam guiding unit in relation to the base, and
   a target search unit having
      a light source for illuminating the target using illumination light,
      a first camera, which defines a first field of vision, having a first position-sensitive detector, wherein
         a first image can be acquired using the first camera and at least a part of the illumination light reflected on the target can be determined in the first image as a first target position and
         the first camera is arranged having its optical axis offset to the measuring axis, and
      a second camera, which defines a second field of vision, having a second position-sensitive detector, wherein
         a second image can be acquired using the second camera and at least a part of the illumination light reflected on the target can be determined in the second image as a second target position,
         the second camera is arranged having its optical axis offset to the measuring axis, and
         the second camera is arranged having fixed positioning and alignment, which is known in relation to the first camera and to the measuring axis, and the first and second cameras are arranged such that the fields of vision of the first and second cameras at least partially overlap,
   wherein
   in the scope of the target search unit a computer is present configured such that upon execution of a search functionality, a finding of the target is performed as a function of an integrated consideration of the first target position of the first image and the second target position of the second image and based thereon the measuring radiation is aligned automatically on the target by control of the beam guiding unit, so that the measuring radiation is incident on the target and the distance to the target can be precisely determined by means of the fine distance meter,
   whereby the computer is configured such that upon execution of the search functionality ambiguities, which are present upon a use of only the first target position for finding the target and by way of a parallax provided by the measuring axis and the optical axes of the first and second cameras, are resolved by a mutual use of both the first and also the second target positions for finding the target, and
   the laser tracker has a calibration function, upon the execution of which the fixed positioning and alignment of the second camera in relation to the first camera and in relation to the measuring axis are determined, in particular wherein in the scope of the calibration function:
   the target is measured, by means of the measuring radiation emitted by the beam guiding unit, in at least two different measuring positions offset to another,
   for each of said two measuring positions of the target a first image is acquired with the first camera and a second image is acquired with the second camera,
   the first target position of each first image and second target position of each second image are determined, and the fixed positioning and alignment of the second camera in relation to the first camera and in relation to the measuring axis are derived from said measuring of the target in the at least two measuring positions and the first and second target positions determined thereto.

2. The laser tracker as claimed in claim 1, wherein the computer is configured such that upon execution of the search functionality, a coarse distance to the target is determined as a function of the first and second target positions.

3. The laser tracker as claimed in claim 2, wherein the computer is configured such that upon execution of the search functionality, respectively a target direction to the target is derived as a function of the first and second target positions, and a coarse position is determined as a function of the target directions, using photogrammetry.

4. The laser tracker as claimed in claim 3, wherein the first and second cameras are arranged such that the measuring axis lies at least partially in an overlap region defined by the overlapping fields of vision of the first and second cameras.

5. The laser tracker as claimed in claim 4, wherein the first and second cameras are arranged such that their optical axes are respectively arranged:
   offset in parallel to the measuring axis, or
   at a defined angle in relation to the measuring axis, and/or
   the first and second cameras are arranged axially-symmetrical in relation to the measuring axis.

6. The laser tracker as claimed in claim 1, wherein:
   the light source is implemented such that the illumination light can be emitted divergently having a wavelength in the infrared range: or
   the first and second cameras are implemented such that essentially only infrared illumination light can be acquired, wherein the first and second cameras each have a light filter for essentially exclusive transmission of the infrared light to the respective position-sensitive detector.

7. The laser tracker as claimed in claim 1, wherein the laser tracker has a third or multiple cameras having a third or multiple position-sensitive detectors for acquiring a third or multiple target positions, wherein the third or multiple cameras are arranged such that a third or multiple optical axes of the third or multiple cameras are arranged offset to the measuring axis, and the computer is configured such that upon execution of the search functionality, the searching for the target is performed as a function of the three or more target positions, wherein at least one of the cameras is implemented to acquire light in a defined range around an illumination wavelength of the illumination light.

8. The laser tracker as claimed in claim 1, wherein the laser tracker has:
   a support, which is pivotable by a motor about the standing axis in relation to the base and defines the inclination axis, and
   a targeting unit, which is implemented as a beam guiding unit and is pivotable by a motor about the inclination axis in relation to the support, having a telescope unit for emitting the measuring radiation and for receiving at least a part of the measuring radiation reflected on the target.

9. A method for searching for a target using a laser tracker, the laser tracker comprising:
   a base which defines a standing axis, and
   a beam guiding unit for emitting measuring radiation and for receiving at least a part of the measuring radiation reflected on the target, wherein
   the beam guiding unit is pivotable by a motor about the standing axis and an inclination axis in relation to the base, and
   a measuring axis is defined by an emission direction of the measuring radiation, wherein the method is performed by:
   an illumination of the target is performed using illumination light,
   a position-sensitive acquisition of a first image is performed using a first camera, which is arranged on the laser tracker and defines a first field of vision, wherein the first camera is arranged having its optical axis offset to the measuring axis, and
   a first determination of at least a part of the illumination light reflected on the target is performed as a first target position in the first image,
   a position-sensitive acquisition of a second image using a second camera, which is arranged on the laser tracker and defines a second field of vision, wherein the second camera:
      is arranged having its optical axis offset to the measuring axis, and
      is arranged having fixed positioning and alignment, which is known in relation to the first camera and to the measuring axis, and the first and second cameras are arranged such that the fields of vision of the first and second cameras at least partially overlap,
   a second determination of at least a part of the illumination light reflected on the target as a second target position in the second image, and
   finding of the target as a function of an integrated consideration of the first target position of the first image and second target position of the second image with a thereon based automatic alignment of the measuring radiation on the target by control of the beam guiding unit,
   whereby ambiguities, which are present upon a use of only the first target position for finding the target and by way of a parallax provided by the measuring axis and the optical axes of the first and second cameras, are resolved by a mutual use of both the first and also the second target positions for finding the target, and
   wherein
   the fixed positioning and alignment of the first camera in relation to the first camera and in relation to the measuring axis are calibrated by:
   measuring the target, by means of the measuring radiation, in at least two different measuring positions offset to another,
      for each of said two measuring positions of the target a first image is acquired with the first camera and a second image is acquired with the second camera, determining the first target position of each first image and second target position of each second image, and
   deriving the fixed positioning and alignment of the second camera in relation to the first camera and in relation to the measuring axis from the said measuring of the target in the at least two measuring positions and the first and second target positions determined thereto.

10. The method as claimed in claim 9, wherein ambiguities, which are present upon a use of only the first target position for finding the target and by way of a parallax provided by the measuring axis and the optical axes of the first and second cameras, are resolved by a mutual use of both the first and also the second target positions.

11. The method as claimed in claim 9, wherein a coarse distance to the target is determined as a function of the first and second target positions.

12. The method as claimed in claim 11, wherein respectively a target direction to the target is derived as a function of the first and second target positions, and a coarse position of the target is determined as a function of the target directions using photogrammetry.

13. A computer program product having program code which is stored on a non-transitory computer readable medium, for controlling or carrying out the method as claimed in claim 9.

14. A laser tracker for progressive tracking of a reflective target and for determining a position of the target having:
   a base which defines a standing axis,
   a beam guiding unit for emitting measuring radiation and for receiving at least a part of the measuring radiation reflected on the target, wherein
      the beam guiding unit is pivotable by a motor about the standing axis and an inclination axis in relation to the base, and
      a measuring axis is defined by an emission direction of the measuring radiation,
   a fine distance meter for precisely determining the distance to the target by means of the measuring radiation,
   an angle sensor for determining an alignment of the beam guiding unit in relation to the base, and
   a target search unit having:
      a light source for illuminating the target using illumination light,
      a first camera, which defines a first field of vision, having a first position-sensitive detector, wherein:
         a first image can be acquired using the first camera and at least a part of the illumination light reflected on the target can be determined in the first image as a first target position, and
         the first camera is arranged having its optical axis offset to the measuring axis, and
      a second camera, which defines a second field of vision, having a second position-sensitive detector, wherein:
         a second image can be acquired using the second camera and at least a part of the illumination light reflected on the target can be determined in the second image as a second target position,
         the second camera is arranged having its optical axis offset to the measuring axis, and
         the second camera is arranged having fixed positioning and alignment, which is known in relation to the first camera and to the measuring axis, and the first and second cameras are arranged such that the fields of vision of the first and second cameras at least partially overlap,
   wherein:
   in the scope of the target search unit a computer is present configured such that upon execution of a search functionality, a finding of the target is performed as a function of an integrated consideration of the first target position of the first image and second target position of the second image and based thereon the measuring radiation is aligned automatically on the target by control of the beam guiding unit, so that the measuring radiation is incident on the target and the distance to the target can be precisely determined by means of the fine distance meter,
   whereby the computer is configured such that upon execution of the search functionality ambiguities, which are present upon a use of only the first target position for finding the target and by way of a parallax provided by the measuring axis and the optical axes of the first and second cameras, are resolved by a mutual use of both the first and also the second target positions for finding the target, and
   the computer has a target position determination functionality, upon the execution of which the first target position of the first image and the second target position of the second image are determined by means of image processing such that in the respective image a shape of the light cross-section of the illumination light reflected on the target and acquired in the respective image is determined, and thereby the first respectively the second target position is determined, which represent the respective location of the illumination light acquired in the image in the respective image.

15. The laser tracker as claimed in claim 14, wherein:
   the target position determination functionality is configured such that the first and second target positions are determined:
      by means of focal point calculation based on the shape acquired in the respective image, in particular by means of brightness and/or contrast analysis, and/or
      by means of matching, in particular bringing into correspondence, of the shape acquired in the respective image with a stored pattern on the basis of a best fit method, in particular with subpixel precision, wherein the respective target position of the illumination light acquired in the image is determined on the basis of the location of the pattern in the image which is brought into correspondence, in particular with subpixel precision.

16. A method for searching for a target using a laser tracker, wherein the laser tracker has:
   a base which defines a standing axis,
   a beam guiding unit for emitting measuring radiation and for receiving at least a part of the measuring radiation reflected on the target, wherein:
      the beam guiding unit is pivotable by a motor about the standing axis and an inclination axis in relation to the base, and
      a measuring axis is defined by an emission direction of the measuring radiation,
   wherein the method is performed by:
   an illumination of the target using illumination light,
   a position-sensitive acquisition of a first image using a first camera, which is arranged on the laser tracker and defines a first field of vision, wherein the first camera is arranged having its optical axis offset to the measuring axis,
   a first determination of at least a part of the illumination light reflected on the target as a first target position in the first image,
   a position-sensitive acquisition of a second image by using a second camera, which is arranged on the laser tracker and defines a second field of vision, wherein the second camera:
      is arranged having its optical axis offset to the measuring axis, and
      is arranged having fixed positioning and alignment, which is known in relation to the first camera and to the measuring axis, and the first and second cameras are arranged such that the fields of vision of the first and second cameras at least partially overlap,
   a second determination of at least a part of the illumination light reflected on the target as a second target position in the second image, and finding of the target as a function of an integrated consideration of the first target position of the first image and second target position of the second image with a thereon based automatic alignment of the measuring radiation on the target by control of the beam guiding unit, whereby ambiguities, which are present upon a use of only the first target position for finding the target and by way of a parallax provided by the measuring axis and the optical axes of the first and second cameras, are resolved by a mutual use of both the first and also the second target positions for finding the target, and wherein:

the first target position of the first image and the second target position of the second image are determined by means of image processing such that in the respective image a shape of the light cross-section of the illumination light reflected on the target and acquired in the respective image is determined, and thereby the first respectively second target position is determined, which represent the respective location of the illumination light acquired in the image in the respective image.

17. The method as claimed in 16, wherein the determination of the first and second target positions is performed respectively:

by means of a focal point calculation based on the shape acquired in the respective image, in particular by means of brightness and/or contrast analysis, and/or by means of matching, in particular bringing into correspondence, of the shape acquired in the respective image with a stored pattern on the basis of a best fit method, in particular with subpixel precision, wherein the respective target position of the illumination light acquired in the image is determined on the basis of the location of the pattern in the image which is brought into correspondence, in particular with subpixel precision.

18. The laser tracker as claimed in claim 14, wherein the computer is configured such that upon execution of the search functionality, a coarse distance to the target is determined as a function of the first and second target positions.

19. The laser tracker as claimed in claim 18, wherein the computer is configured such that upon execution of the search functionality, respectively a target direction to the target is derived as a function of the first and second target positions, and a coarse position is determined as a function of the target directions, using photogrammetry.

20. The laser tracker as claimed in claim 19, wherein the first and second cameras are arranged such that the measuring axis lies at least partially in an overlap region defined by the overlapping fields of vision of the first and second cameras.

21. The laser tracker as claimed in claim 20, wherein the first and second cameras are arranged such that their optical axes are respectively arranged:

offset in parallel to the measuring axis, or at a defined angle in relation to the measuring axis, and/or the first and second cameras are arranged axially-symmetrical in relation to the measuring axis.

22. The method as claimed in 16, wherein a coarse distance to the target is determined as a function of the first and second target positions.

23. The method as claimed in 22, wherein respectively a target direction to the target is derived as a function of the first and second target positions, and a coarse position of the target is determined as a function of the target directions using photogrammetry.

24. A computer program product having program code which is stored on a non-transitory computer readable medium, for controlling or carrying out the method as claimed in claim 16.

* * * * *